April 16, 1957  F. A. TALBOT  2,788,671
POWER STEERING APPARATUS OF THE HYDRAULIC TYPE
Filed Dec. 21, 1953  9 Sheets-Sheet 2
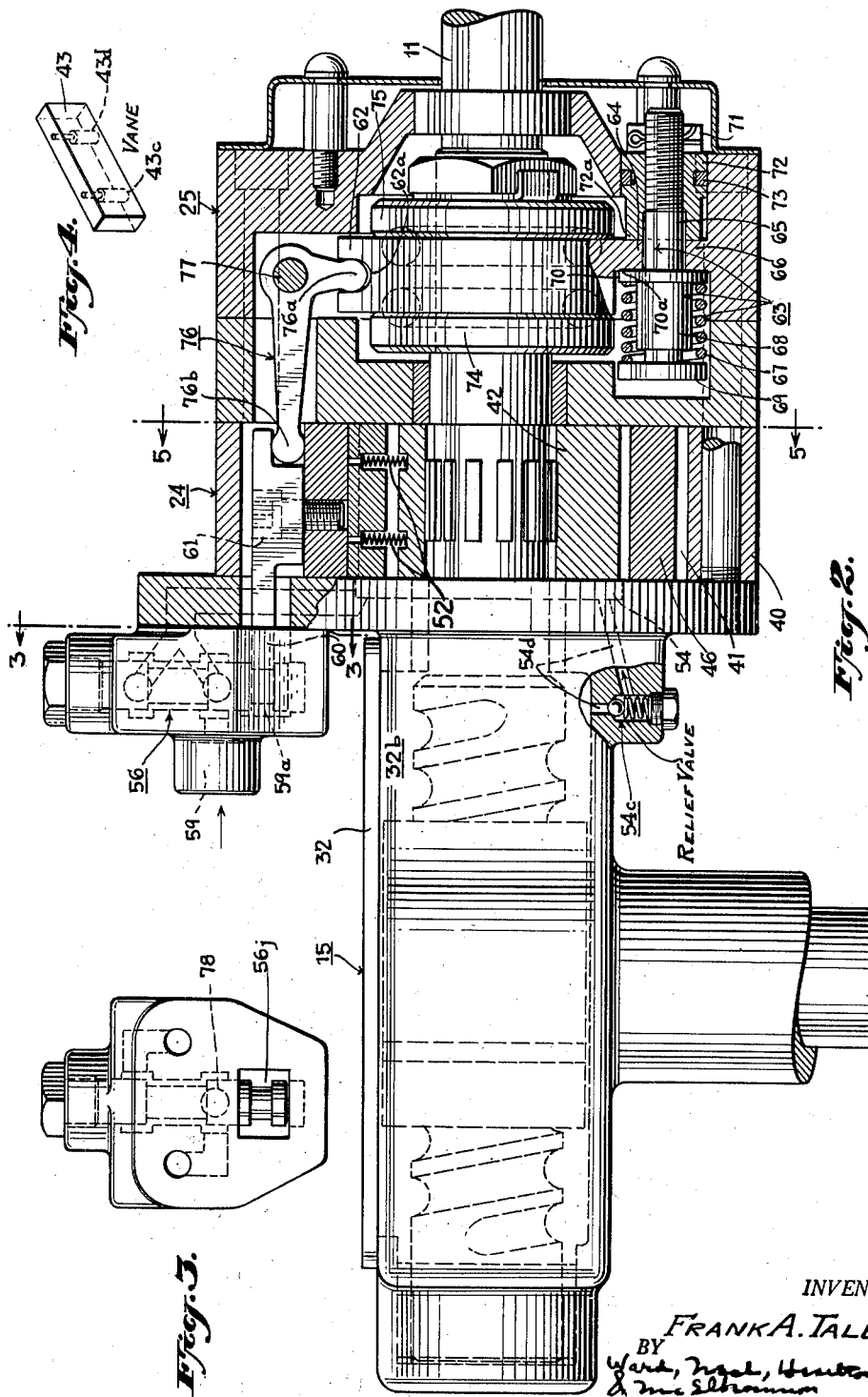
INVENTOR.
FRANK A. TALBOT.
BY
ATTORNEYS.

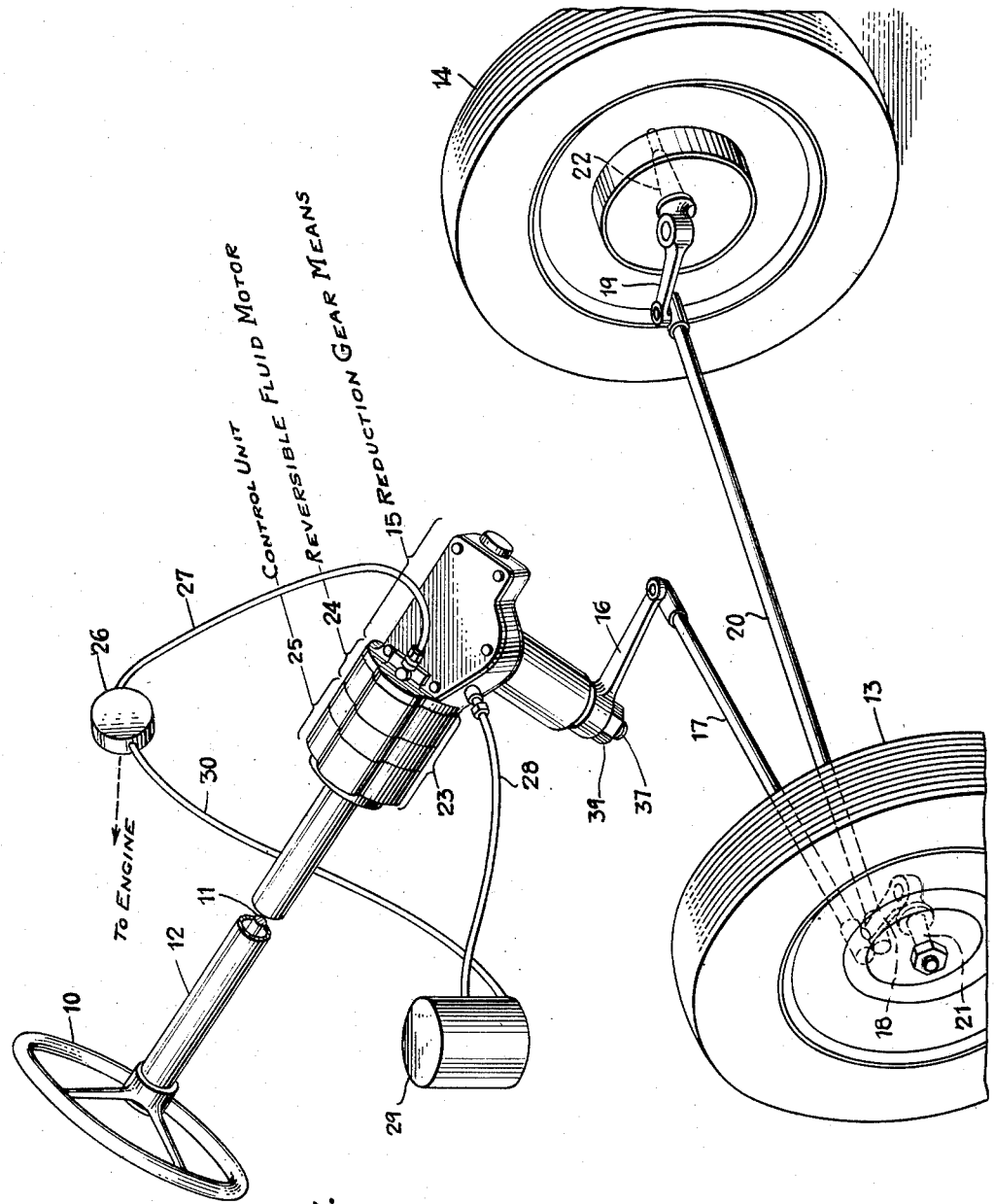

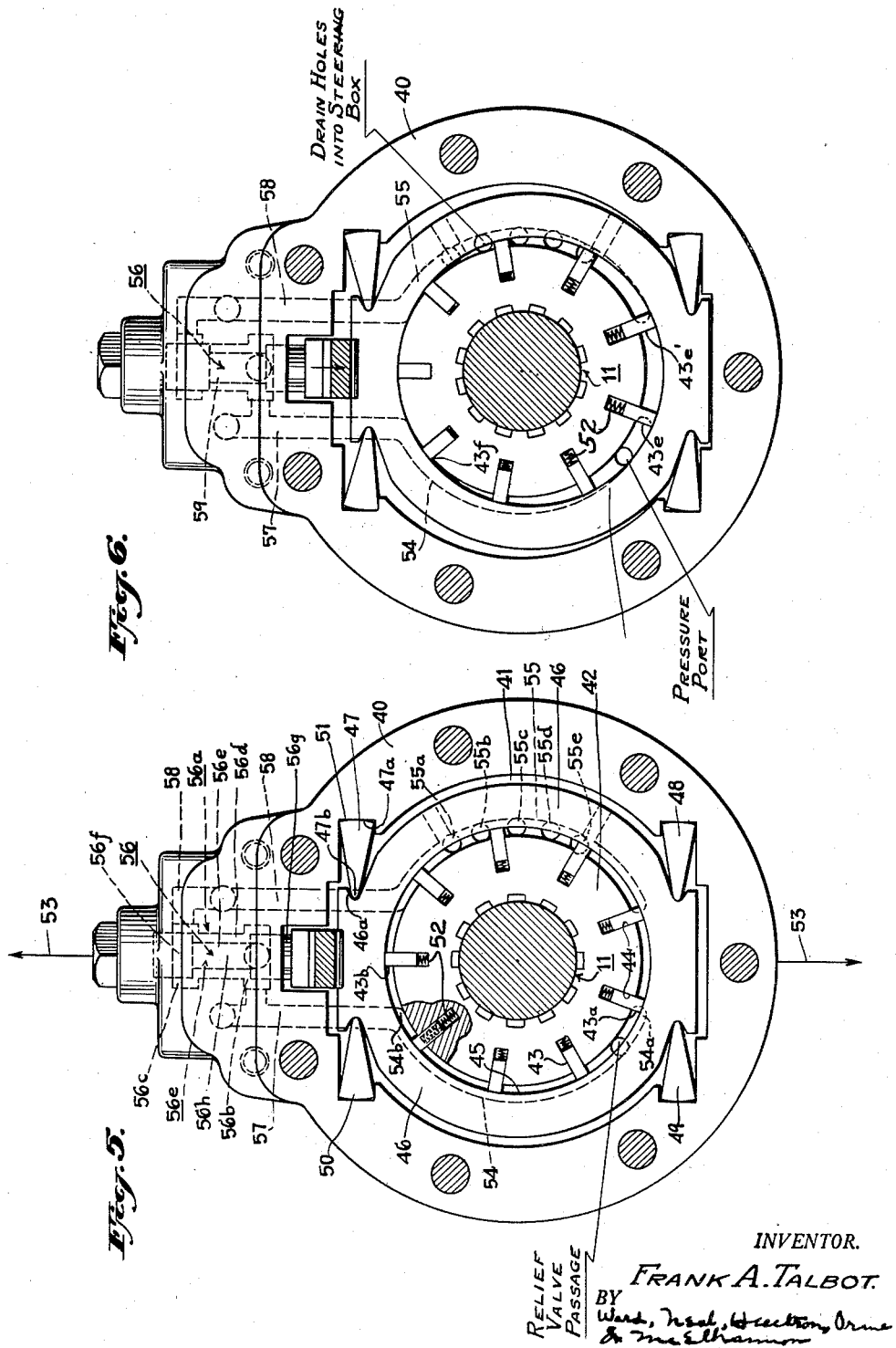

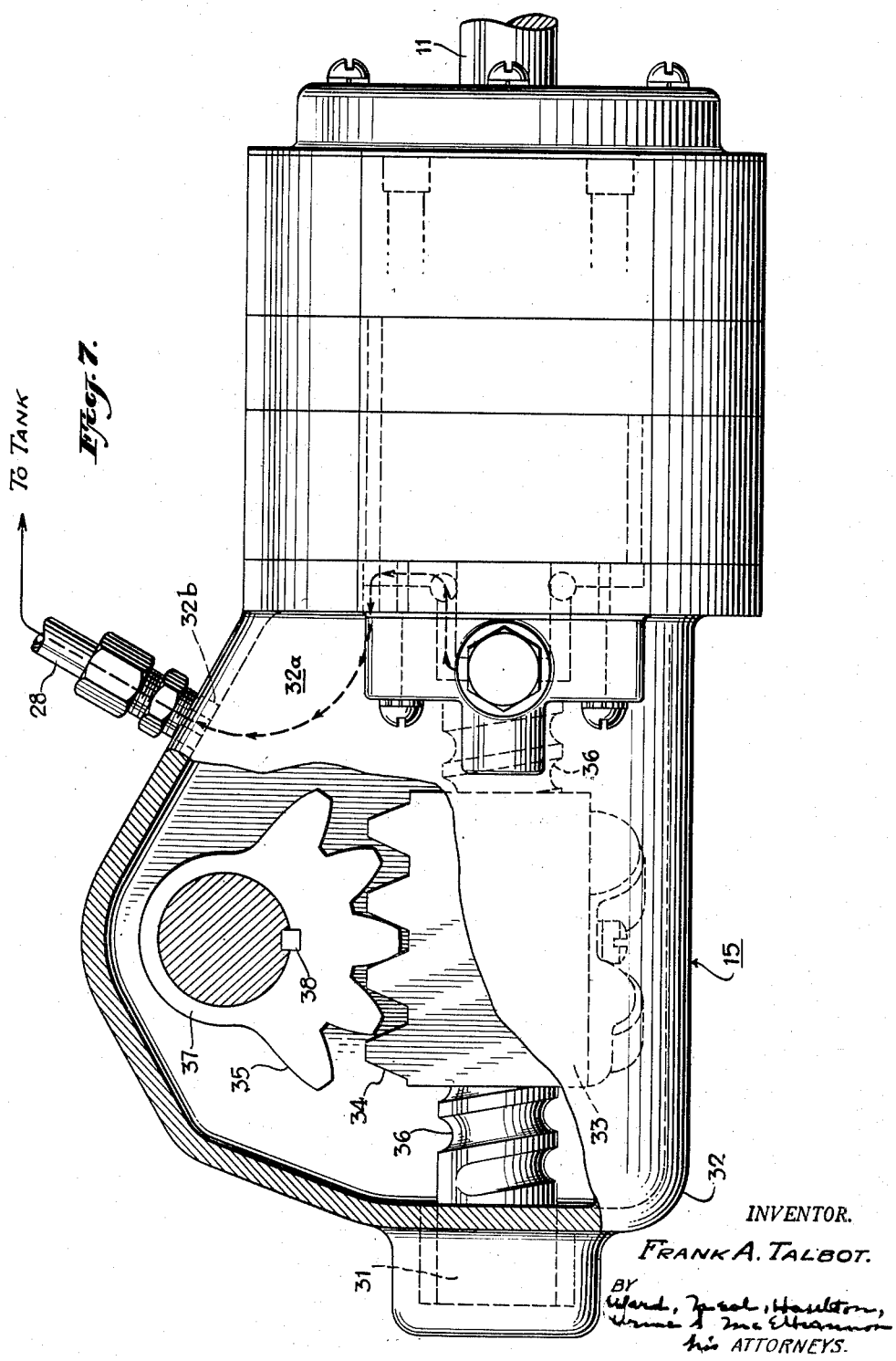

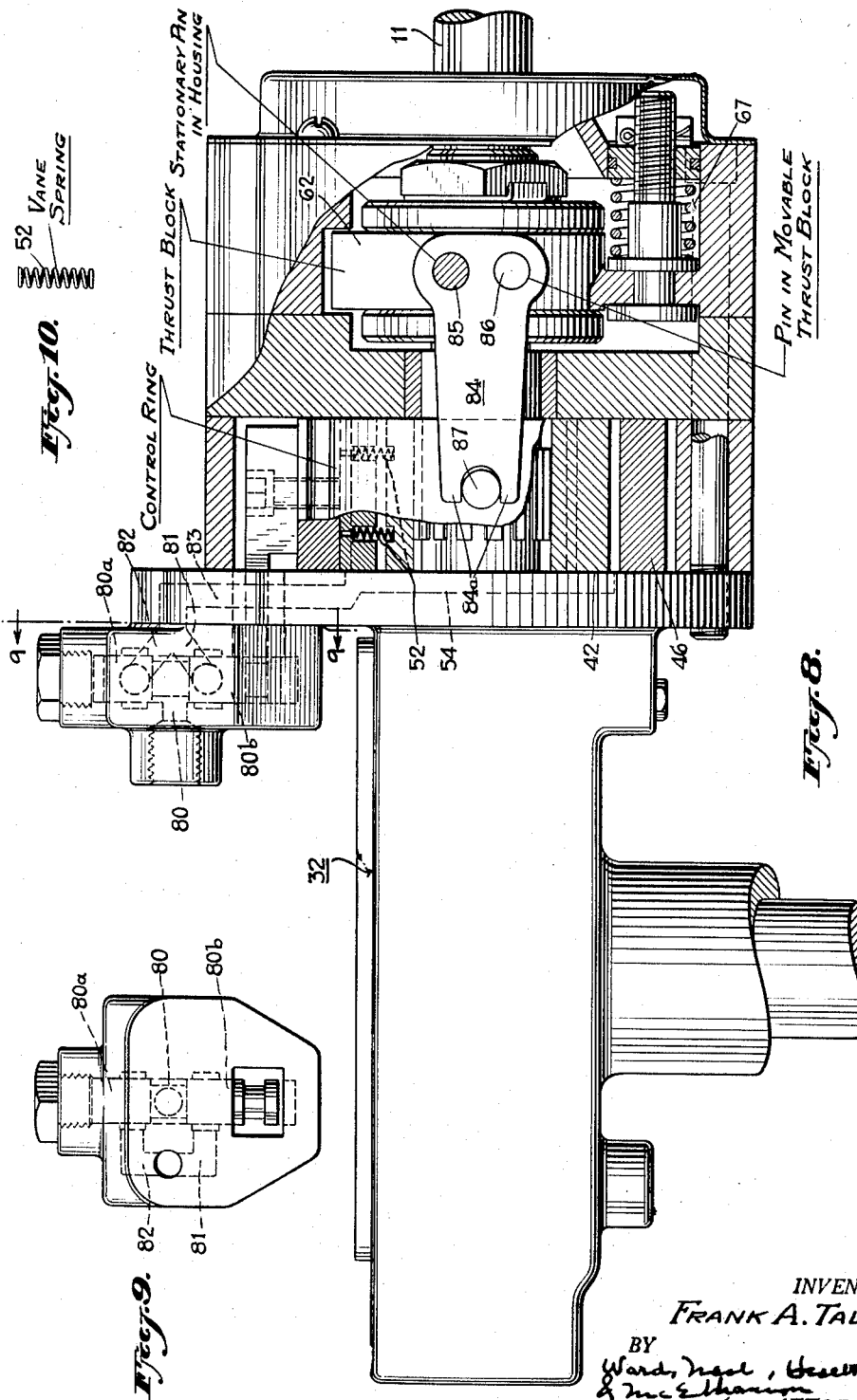

April 16, 1957 F. A. TALBOT 2,788,671
POWER STEERING APPARATUS OF THE HYDRAULIC TYPE
Filed Dec. 21, 1953 9 Sheets-Sheet 6
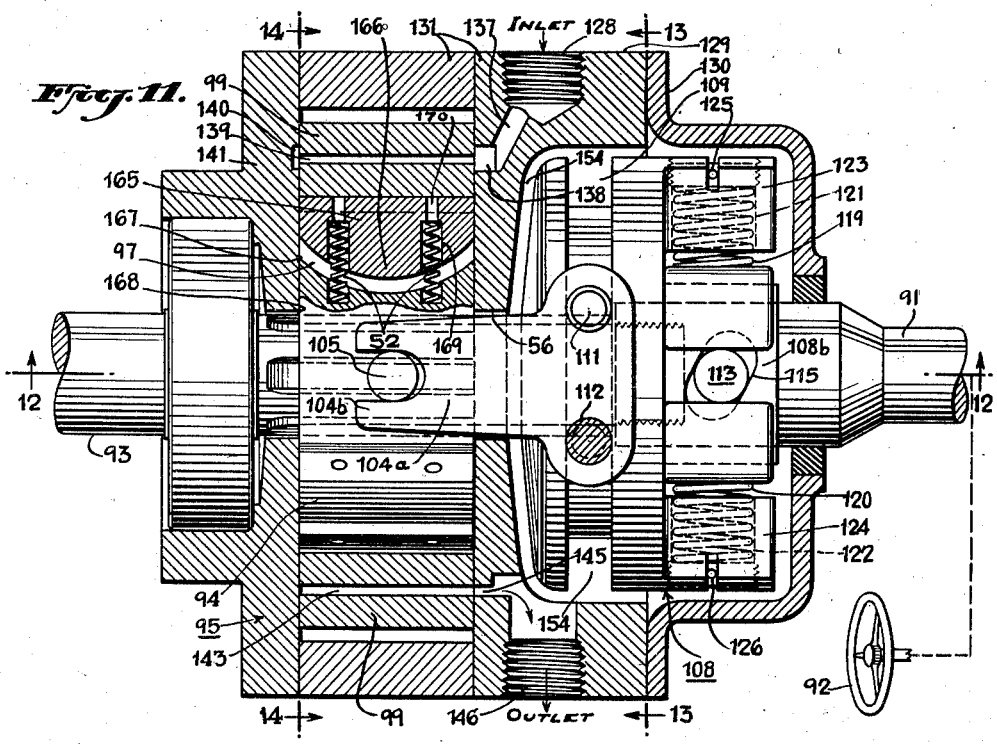
INVENTOR.
FRANK A. TALBOT.
BY
his ATTORNEYS.

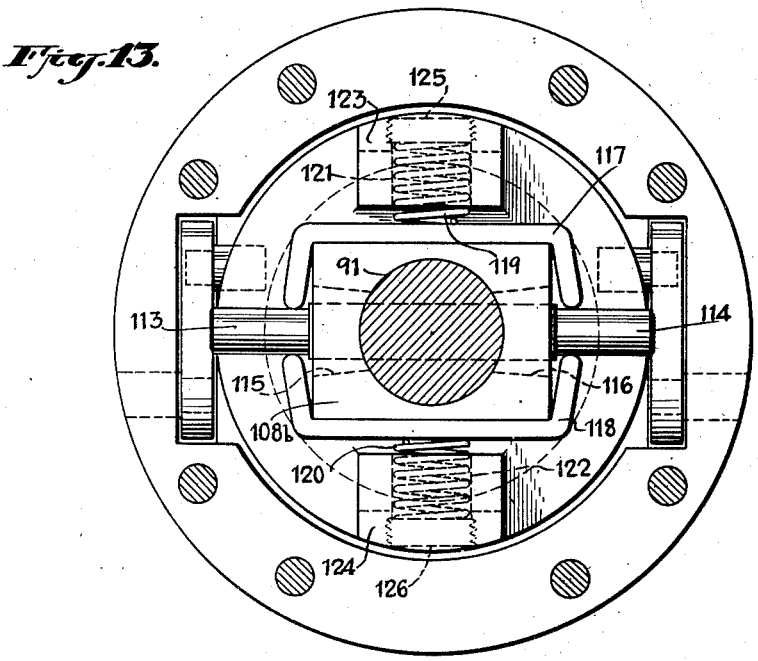

April 16, 1957  F. A. TALBOT  2,788,671
POWER STEERING APPARATUS OF THE HYDRAULIC TYPE
Filed Dec. 21, 1953  9 Sheets-Sheet 8

INVENTOR.
FRANK A. TALBOT.
BY
ATTORNEYS.

April 16, 1957 F. A. TALBOT 2,788,671
POWER STEERING APPARATUS OF THE HYDRAULIC TYPE
Filed Dec. 21, 1953 9 Sheets-Sheet 9

INVENTOR.
FRANK A. TALBOT.
BY
ATTORNEYS.

United States Patent Office 2,788,671
Patented Apr. 16, 1957

2,788,671

POWER STEERING APPARATUS OF THE HYDRAULIC TYPE

Frank A. Talbot, Tuckahoe, N. Y., assignor to Hydra-Power Corporation, New Rochelle, N. Y., a corporation of New York Application December 21, 1953, Serial No. 399,336

7 Claims. (Cl. 74—388)

This invention relates to fluid actuated power systems, and more particularly to improvements in hydraulic servo systems, such as those which are employed to assist in the steering of automotive vehicles.

One of the objects of the present invention is to provide an improved hydraulic servo system which is particularly adapted for power steering of automotive vehicles, such system being of substantially greater sensitivity than those heretofore proposed and which calls forth power assistance only to the extent needed.

A further object is to provide a power steering system, particularly for automotive vehicles, wherein friction losses due to mechanically engaged elements is reduced to a minimum.

A further object is to provide a power steering system in which a failure of the hydraulic or fluid pressure will cause the system to revert to manual operation without imposing any appreciable drag or stiffness upon the manual effort of the driver.

Another object is to provide a novel system of this character having novel means for the prevention of cavitation within the fluid motor which may produce a drag upon the steering system.

A further object is to provide power steering apparatus having improved and simplified means for counteracting road steering forces upon the front wheels (e. g. due to irregular road surface) by force due to hydraulic or fluid pressure, such counteracting force being called upon only to the extent needed.

The invention, in one aspect thereof, is constituted by a fluid actuated servo mechanism, the force of which is evoked only to the extent of the need therefor and then only when the master force exceeds a preselected minimum value. Such mechanism is particularly adapted for power steering of automotive vehicles in that the extent of power assistance to the driver is a function of the extent of resistance of the steering means to the torque applied manually at the steering wheel. The measurement of the power assist is made by novel means and with extreme accuracy thereby to prevent unnecessary power consumption by the device. The novel device is adapted for use with a suitable engine driven fluid pump or pressure accumulator for providing fluid, such as oil, under pressure to a power assist unit. The latter includes a rotor preferably embracing and drivably secured to the steering shaft and having radially extending therefrom a plurality of vanes upon which the fluid works, the rotor being within a suitable housing. Each of the vanes is slidably mounted in a radial slot in the rotor and urged outwardly by spring means towards the cylindrical inner surface of a transversely shiftable control ring within such housing. The latter ring normally is concentric with the steering shaft in which neutral position the vanes protrude equally from the rotor and the pressure fluid conducted thereto cannot turn same. However, when the control ring is moved to an eccentric position the vanes protrude unequally and the pressure fluid can turn the rotor by a force which is a function of the degree of control ring eccentricity. The ring is caused to move within selected limits transversely of the rotor from such neutral concentric position as a function of the degree of resistance of the steering means to the torque manually applied to the steering wheel. Such degree of resistance is measured by determining the extent of reaction between manual steering torque and the mechanical reduction (advantage) means interposed between the steering wheel and the vehicle's front wheels. This is done by determining the force acting axially of the steering shaft, which force occurs in response to such manual torque and results from reaction with said reduction means. An axially shiftable element (which e. g. may be the steering shaft or a separate element) is drivably connected to said control ring for moving same in response to such reaction. Said axially shiftable element is, by suitable means, resiliently held in a norm position along the axis of said steering shaft in which position the control ring is concentric with said shaft and thus is in neutral.

Various, further and more specific objects, features and advantages of the invention will clearly appear from the detailed description given below taken in connection with the accompanying drawings which form a part of this specification and illustrate, by way of example, preferred arrangements of apparatus for carrying out the invention. The invention consists in such novel combinations of features as may be shown and described in connection with the device herein disclosed.

In the drawings:

Fig. 1 is a perspective view of a system embodying the present invention;

Fig. 2 is a plan view, partly in section and with parts broken away, illustrating a first embodiment of the present invention;

Fig. 3 is a sectional view taken substantially along line 3—3 of Fig. 2;

Fig. 4 is a perspective view of one form of vane employed in a fluid-actuated motor shown in Fig. 2;

Fig. 5 is a sectional view taken substantially along line 5—5 of Fig. 2 and showing the principal elements of such hydraulic or fluid-actuated motor in a concentric or neutral position;

Fig. 6 is similar to Fig. 5 except that such principal elements are shown in a different operating position wherein the fluid-actuated motor is caused to turn;

Fig. 7 is a plan view of the elements shown in Fig. 2 particularly illustrating reduction gear means for transmitting torque from the steering shaft;

Fig. 8 is a side elevation, partly in section and with parts broken away, showing a modification of the embodiment of Fig. 2;

Fig. 9 is a sectional view taken substantially on line 9—9 of Fig. 8;

Fig. 10 is a side view, on a slightly enlarged scale, of certain spring means employed in the hydraulic motor of this invention;

Fig. 11 is a side elevation, partly in section and with parts broken away, of a third embodiment of the invention;

Fig. 12 is a bottom view, partly in section and with parts broken away, taken substantially on line 12—12 of Fig. 11;

Fig. 13 is a sectional view taken substantially on line 13—13 of Fig. 11;

Figure 14:
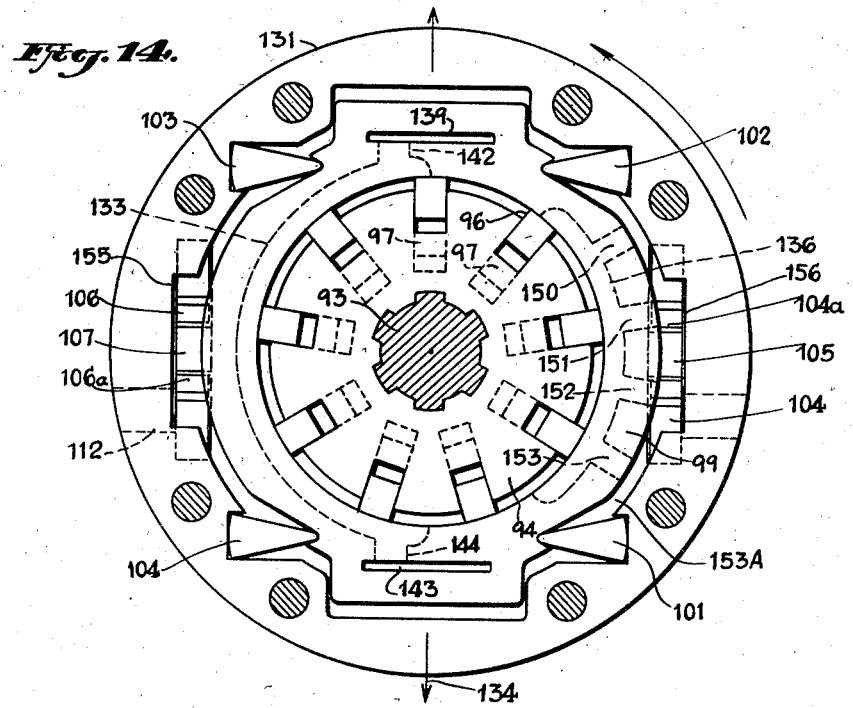
Fig. 14 is a sectional view taken substantially on line 14—14 of Fig. 11 with a control ring of the motor in a norm operating position.

Referring to Fig. 1 of the drawings, there is shown a preferred environment in which the present invention is employed as a power steering device for an automotive vehicle.

A steering wheel 10 is provided having a main steering shaft 11 which is embraced within a steering shaft housing 12 in a conventional manner. The steering shaft 11 is operatively connected to two front wheels 13 and 14 of such vehicle, also by conventional means, including reduction gear means 15 to which is connected a pitman arm 16 which is directly connected by means of a rod 17 to a steering knuckle 18. The latter in turn is interconnected to the opposite steering knuckle 19 by means of a cross rod 20. The wheels 13 and 14 are respectively mounted in a conventional way upon bearing shafts 21 and 22.

The fluid power assist for the manual effort of the driver is effected by means of a reversible fluid motor and control unit 23 embracing a reversible motor 24 and its control unit 25. Fluid, such as oil, under pressure is directed to the motor 24 by means of a suitable pump 26 which may be driven by the engine of the automotive vehicle. The pump 26 directs fluid under pressure to the motor 24 by means of a conduit 27, such fluid being exhausted via a conduit 28 to a reservoir 29, which in turn is in communication with the intake of the pump 26 via a conduit 30. If desired, a suitable pressure accumulator (not shown) may be employed in the system.

In order to achieve extraordinary and heretofore unattained sensitivity in the control of the hydraulic power assistance to the manual steering effort of the driver, the reversible fluid motor 24 is preferably mounted with the fluid-actuated rotor thereof concentric with the main steering shaft 11. By means of a novel coaction between the main steering shaft and the principal control elements of such motor, said highly sensitive fluid power assistance is achieved. In the embodiment of Figs. 1–10, the actuation of the principal control elements of the reversible fluid-actuated motor 24 is accomplished in response to the axial movement of the main steering shaft 11 which in turn occurs in a direction which is responsive to the direction of turning of the steering wheel 10. Such axial movement is the result of a reaction between said steering shaft 11 and the reduction gear means 15 (Fig. 7) aforementioned.

The elements which produce such axial movement are well shown in Fig. 7 wherein the main steering shaft 11 is shown as journaled in a conventional way at 31 within a housing 32 for the reduction gear means 15. The latter comprises, in the form shown, a nut member 33 having a rack 34 formed therein for engaging a sector gear 35. The nut member 33 shifts axially of the shaft 11 by virtue of the cooperation thereof with helical grooves or threads 36 formed in shaft 11. Such cooperation may be in the nature of the conventional threaded nut and bolt, or cooperating helical grooves (not shown) may be formed within the inner surface of the nut member 33 and suitable spherical balls may effect such cooperation. Such groove and ball cooperation is also of a presently conventional variety wherein said balls may recirculate in the helical cooperating paths formed between the shaft 11 and the nut 33.

The sector gear 35 is rigidly secured to a shaft 37, for example, by suitable keying means, as at 38. The aforementioned pitman arm 16 is secured to the lower extremity of the arm 37 (Fig. 1) by means of a nut 39.

The reaction between the rack 34 (upon the nut 33) and the sector gear 35 will cause axial movement of the steering shaft 11 and the direction of such movement would depend upon the direction of rotation of such shaft. Suitable means, to be explained more fully hereinafter, are employed for restricting the axial movement of the shaft 11 within preselected limits and for resiliently retaining said shaft in a preselected norm position with respect to such axial movement.

Referring to Figs. 2–6, there will now be described the reversible fluid actuated motor 24, together with its control means 25, the latter embracing the aforementioned means for resiliently retaining the steering shaft in a norm axial position. The motor 24 is constituted by a housing generally designated at 40 having an internal chamber 41 therein which preferably is of circular cross section, as viewed in Fig. 5. A vaned fluid-operated rotor 42 is provided which embraces the main steering shaft 11 and is preferably keyed or splined thereto. The rotor 42, in order to accommodate vanes 43, is radially slotted, as at 44, there being, for example, nine slots preferably equally spaced about the circumference of a rotor, each slot being adapted for accommodating a single vane 43 in a single slot. One of such vanes 43 is well shown in Fig. 4 and comprises, in this embodiment, a rectangular solid at least one outer edge of which at all times engages and follows internal surface 45 of control ring 46. Such internal surface 45 is that of a right circular cylinder and such ring 46 is preferably toroidal in shape.

The aforementioned control ring 46 is mounted within the chamber 41 for movement along a path which is transverse to the axis of shaft 11 and hence of the rotor 42. The neutral position of such ring is, as shown in Fig. 5, concentric with the shaft 11 in which position the internal cylindrical surface 45 is similarly concentric.

The means for mounting the control ring 46 for such movement transversely of the axis of the shaft 11 comprise, in the form shown, four guide fingers 47, 48, 49 and 50 which in cross section (Fig. 5) are wedge-shaped and are rounded at their opposite extremities. For example, the guide finger 47 is rounded at 47a for rocking movement against a flat supporting surface 51 formed within the chamber 41. The opposite or tapered extremity of the wedge 47 is rounded at 47b for engaging a groove 46a formed in the control ring 46. The guide fingers 47 and 50 are oppositely disposed with their tapered extremities pointed toward one another and the same is true of the opposed guide fingers 48 and 49. Said guide fingers are disposed parallel to one another and similarly cooperate with their corresponding control ring grooves and bearing surfaces. Motor 24 is so constructed and arranged that when the control ring 46 is concentric, as shown in Fig. 5, the areas of the vanes 43a and 43b on which pressure differentials work are equal and thus the motor is in a neutral condition. However, a shifting of the control ring, either upwardly or downwardly from such concentric position, will reduce such area for one of such vanes, e. g. 43b and increase it for the other vane 43a. Vanes 43a and 43b are selected because each is between exhaust and inlet ports, as will appear hereinafter. Resilient means, for example, a pair of coil springs 52 (Fig. 2) is provided for resiliently urging each vane 43 radially outwardly toward said inner cylindrical surface 45. A pair of recesses 43c, 43d (Fig. 4) is formed in the under side of each vane 43 into which springs 52 are inserted.

The direction of movement of the control ring 46 is indicated by the line 53 of Fig. 5, such line being vertical in this figure. Such line or axis determines the positioning of the conduits or grooves through which fluid under pressure is directed to the rotor.

As shown in Fig. 5, there is normally a preselected space between the inner cylindrical surface 45 of ring 46 and the periphery of the rotor 42, such space being uniformly distributed in volume around the periphery of the rotor when the ring is in a neutral or concentric position. It is to this space between the rotor and said ring that fluid under pressure is directed thereby to drive the rotor when the latter moves out of such concentric position.

For this purpose a pair of substantially semi-circular ports or grooves 54, 55 are formed in the surface of the inner chamber 41, one on each side of the axis 53. Grooves 54 and 55 are respectively inlet and exhaust ports as will appear more fully below. These grooves are in communication with control valve means 56 which, in this embodiment, are of the open center variety, such communication being respectively via passages 57 and 58.

A chord drawn from the lower extremity 54a of the groove 54 to its upper extremity 54b is substantially parallel to the axis 53 and the same is true with respect to an analogous chord of the groove 55. Thus the transverse movement of the control ring 46 is substantially lengthwise of said arcuate grooves 54 and 55.

In order to actuate motor 24, the fluid under pressure is so directed that it acts upon at least one vane on one side of axis 53, there being no counter-balancing pressure upon a corresponding vane or vanes on the other side of such axis.

In both the open center type of valve means 56, above mentioned, and in the closed center type, to appear below, the actuating fluid is directed to the same side of the rotor e. g. to groove 54. Thus a change in rotational direction is not achieved by switching the flow of pressure fluid from one side of such axis 53 to the other.

Groove 54 thus is always the inlet groove for fluid under pressure (except when the ring 46 is concentric when the pressure in both grooves is at the same low value) and the groove 55 is the exhaust groove, the fluid passing out via exhaust ports 55a, 55b, 55c, 55d and 55e.

Consequently, the open center valve means 56 is so constructed and arranged that it permits fluid under equal pressure (low) to reach both grooves 54, 55 when the ring 46 is concentric but closes off passage 58 to groove 55 whenever the ring 46 moves out of such concentricity with rotor 42.

The above is accomplished by conforming a valve passage 56a as shown in Figs. 2 and 5 as follows: Two valve chambers 56b and 56c of relatively enlarged diameter are interconnected by an intermediate passage 56d of relatively smaller diameter. A dumbbell type of valve element 56e is employed having enlarged end pieces 56f and 56g interconnected by a rod 56h. The passages 57 and 58 (respectively to grooves 54 and 55) are respectively directly in communication with valve chambers 56b and 56c. When ring 46 is concentric with rotor 42, the end pieces 56f and 56g are positioned to permit free flow of fluid from a pressure inlet 59 to both chambers 56b and 56c. Inlet 59 is always directly in communication with chamber 56b. Consequently regardless of the position of valve element 56e fluid can always reach groove 54 via passage 57. However, when valve element 56e moves either up or down, the flow of fluid to groove 55 (via passage 58) is cut off.

In view of the above it is necessary for groove 55 to be in communication with a suitable exhaust passage or passages. Accordingly, the aforementioned exhaust ports 55a, 55b, 55c, 55d and 55e are formed in housing 40, which ports interconnect exhaust groove 55 with the interior 32a of reduction gear housing 32. The exhaust conduit 28 is connected to housing 32 at 32b to lead the exhausted fluid back to reservoir 29.

Although the valve means 56 above mentioned are of the open center variety, such means can be of the closed center variety, as will fully appear below.

The control ring 46, for example, may be shifted from the neutral position shown in Fig. 5 to that shown in Fig. 6 wherein it is moved downwardly substantially to its lowermost limit. In this condition the valve element 56a is shifted downwardly to close the passage 58, leaving passage 57 open thereby directing fluid under pressure into the inlet groove 54 only. Such fluid in the groove 54 encounters vane areas 43e and 43f (Fig. 6) against which no opposite counterbalancing pressure acts. Vane area 43e (being larger than area 43f) is thus urged to position 43e' and the next successive vane takes the position of 43e. Consequently the rotor 42 and shaft 11 are angularly shifted in a counterclockwise direction, the fluid exhausting through the groove 55 and the channel 58.

Referring now to Fig. 2, it will be seen that the control ring 46 is connected to the movable valve element 56e by a valve actuating finger 60 which may have a bifurcated lefthand extremity for engaging a groove 56j (Fig. 3) formed in the lower extremity of such valve element. The finger 60 preferably is secured tightly to the outer surface of the control ring 46 by means of a screw 61.

It is evident that a movement of the control ring 46 upwardly from its neutral position of Fig. 5 will produce the opposite result, namely, the rotation of the rotor 42 in a clockwise direction.

The system is so constructed and arranged that failure of hydraulic pressure returns the system to conventional manual operation without imposing any drag or stiffness upon the manual efforts of the driver. This is facilitated by a one way relief valve 54c (Fig. 2) which is interposed in a conduit 54d which interconnects the chamber 32b with the inlet groove 54. This valve permits fluid flow only from such chamber into such inlet groove. Consequently if a heavy torque is applied to the shaft 11, and the control ring is moved in such a way that an hydraulic lock tends to form, fluid is taken into the inlet groove 54 via the valve 54c and is discharged in the manner above described via the exhaust groove 55 and the exhaust ports 55a—55e. Consequently, by means of such relief valve, any vacuum within the motor is broken which may occur during pump failure.

Again referring to Fig. 2, the means for shifting the control ring 46 in accordance with axial movement of the steering shaft 11 will now be described. Embracing the shaft 11 within the control unit 25 is a thrust block 62 having a passage therethrough through which said steering shaft extends. Thrust block 62 preferably does not shift angularly with the shaft 11 but is restrained from any axial movement relative to shaft 11.

Such thrust block is resiliently held in a preselected norm position by a centering structure generally designated at 63, including a bifurcated finger 64 which fits in a yoke-like manner half way around a bolt 65 and in alignment with a fixed bifurcated finger 66 which is formed integrally with the housing of the control unit 25. Resilient means are provided for holding said bifurcated fingers 64 and 66 in alignment with one another, as shown in Fig. 2, comprising a helical spring 67 which embraces said bolt 65 and also embraces a sleeve 68. The latter in turn surrounds the bolt 65 over a portion of the length thereof, as will appear below. The helical spring 67 is interposed between a head 69 of the bolt 65 and a washer 70. The latter, if desired, may be secured to the sleeve 68.

At the opposite extremity of the bolt 65 in threaded engagement therewith is a nut 71 which secures in place a sleeve-like spacer element 72 having a groove in the periphery thereof for receiving a suitable packing or sealing means 73 for preventing the escape of fluid. When the thrust block 62 is in its neutral position, the face-to-face annular surfaces at 70a and 72a of the washer 70 and the spacer 72 respectively, resiliently hold the bifurcated finger 64 in alignment with the fixed bifurcated finger 66.

The thrust block 62 is constrained to move axially with the shaft 11 by means of discs 74 and 75 positioned respectively on the left and righthand sides of the block 62. Suitable anti-friction bearings may be interposed between thrust block 62 and said discs 74 and 75.

Consequently when a force is exerted axially upon the shaft 11, which force is sufficient to overcome the helical spring 67, it will be communicated to the thrust block 62 and will shift either the spacer 72 or the washer 70 axially of the bolt 65, depending upon the direction of thrust. The extent of the axial movement is limited by the space between the head 69 of the bolt and the end of the sleeve 68.

The control ring 46 is held in its neutral or concentric position (Fig. 5) when the thrust block 62 is in its norm position (Fig. 2) through the intermediary of a bell crank 76 which is mounted upon a fixed pivot 77 and is provided with an arm 76a which engages a groove 62a in the periphery of the thrust block 62. Another arm 76b is suitably connected to the control ring by, for example, a socket joint as shown in Fig. 2.

The means for resiliently holding the thrust block in its norm position, as shown in Fig. 2, provides means for easily adjusting the torque required to obtain a desired hydraulic assistance to manual steering, by virtue of the position of the nut 71 which enables the adjustment of the constriction of spring 67 in an extremely easy manner and without disassembly of any parts.

Referring now to the modification shown in Fig. 8, the latter is substantially identical to that shown in Fig. 2 with the following exceptions:

(a) In lieu of the open center valve system employed in Fig. 2, there is there employed a closed center system;

(b) A somewhat different operative interconnection is interposed between the thrust block 62 and the control ring 46.

In the forms shown in Figs. 2–6, the fluid under pressure is directed to the motor via the open center valve means 56 entering initially at an inlet orifice 59 into valve chamber 56b and thence to the passages 57 and/or 58. The fluid is directed to both passages when the valve element 56e is in its centered position (Fig. 5) but, as in Fig. 6, is directed only to 57 when the valve element is lowered. The same is true when the valve element is raised from its centered position.

In the form shown in Fig. 8, a movable valve element 80 of the closed center variety is employed which is so constructed and arranged that when in a centered position fluid under pressure cannot reach inlet groove 54 or the rotor 42 because valve collars 80a and 80b simultaneously close passages 81 and 82, both of which lead to the inlet groove 54 adjacent the rotor 42. However, the shifting of the valve element 80 up or down (Fig. 9) will open either the passage 82 or 81 and thus will direct fluid under pressure to the inlet groove 54, in either event via a passage 83.

The fluid will pass from inlet groove 54 into the other groove 55, thence into the reduction gear housing 32 (Fig. 7), and thence to the reservoir 29 via outlet orifice 32b and the conduit 28 as above described.

The means (Fig. 8) for shifting the motor control ring 46, in lieu of a single bell crank 76 (Fig. 2) comprises a pair of parallel control arms 84, one of which is shown in Fig. 8, said control arms being positioned at diametrically opposed sides of the thrust block 62. Each control arm 84 is pivotally secured at one extremity thereof to the fixed outer housing of the control unit 25 by means of a stationary pin 85. Directly beneath this pin each arm 84 is pivotally secured to a pin 86 which is secured to the movable thrust block 62. The opposite extremity of each control arm 84 is bifurcated, as at 84a, for engaging a pin 87 which is rigidly secured to and protrudes from the control ring 46. There are two pins 87 coaxial and diametrically opposed upon ring 46.

Any axial movement of the shaft 11 thus will cause the control arms to shift angularly from their norm position (Fig. 8) either clockwise or counterclockwise, depending upon the direction of axial movement of shaft 11 thereby to shift the control ring 46 in a manner analogous to that described in connection with Fig. 2.

Referring now to Figs. 11 and 12, a second embodiment of the invention will now be described. A primary shaft 91 is employed to which is secured a steering wheel 92. The primary steering shaft 91 is mounted in suitable journals and is coaxial with and engages a secondary steering shaft 93 which also is mounted in suitable journals (not shown). Shaft 93 is connected to the reduction gear means 15 and thence to the wheels 13, 14, as shown in Fig. 1. The manner of coaxial association of these two shafts is well shown in Fig. 12 and consists of a threaded engagement wherein a threaded extremity 93a of the shaft 93 engages an internally threaded portion 91a of the primary shaft 91. This threaded engagement is such that the two shafts are merely required to move axially together but are not thereby caused to rotate with one another except for a coupling mechanism to appear hereinafter which enables the driver of the vehicle to turn both shafts 91 and 92 in the event of failure of oil pressure. However, torque upon the shaft 91 is not communicated to the secondary shaft 93 by means of the threaded engagement at 91 and 93.

The secondary shaft 93 is restrained from axial movement within a few thousandths of an inch which is enough to permit free rotational movement thereof. This embodiment differs from the embodiments heretofore disclosed in that the two shafts 91 and 92 are not permitted to shift axially.

The manner of operatively or drivably associating the primary and the secondary shafts 91 and 92 wherein a power assist is given to the driver thereby to provide a torque for the secondary shaft will now be described.

The righthand extremity of the secondary shaft 93, as viewed in Fig. 12, is provided with splines 93b for the purpose of engaging a rotor 94 of a rotary motor 95 which is substantially similar to the reversible fluid motor 24 above described with the exception of certain distinctions to appear more fully hereinafter. The rotor 94 has a plurality of vanes 96 which extend radially therefrom within slots 97. There are nine such vanes 96 separated by intervals of 40° for reasons which also will appear hereinafter. The motor 95 moves within an outer housing 98 and within a control ring 99 which is analogous to the control ring 46 described hereinabove. The control ring 99 is also constrained to move in a path which is transverse to the axis of the shafts 91 and 92 by means of guide fingers 101—104 which are analogous to the guide fingers 47—50 above described and which are similarly associated with their guide ring.

Control ring 99 is normally maintained in a concentric condition except when a torque of preselected proportion is applied to the primary shaft 91 or fed back to the motor via the wheels 13, 14 as caused by road shock.

The means for so holding the control ring 99 in a concentric condition includes the following: a control arm 104a which is analogous to the control arm 93 in Fig. 8. Arm 104a, by means of a bifurcated portion at 104b, engages a stud 105 on the righthand side of the control ring, as viewed in Fig. 14, and a corresponding bifurcated portion 106a of a control arm 106 engages a stud 107 which is coaxial with the stud 105 and diametrically opposed thereto.

When the primary steering shaft 91 is turned, it is contemplated that the control ring 99 shall be shifted transversely a selected amount provided a selected minimum load exists upon the secondary shaft 92 whereby an hydraulic power assist shall be applied to such secondary shaft and hence to the pitman arm 16 of the steering mechanism.

In the first embodiment the shifting of the control ring of the reversible fluid motor was occasioned by an axial shifting of the main steering shaft which occurred in response to a reaction between the rack and pinion 34, 35 (Fig. 7).

However, in the embodiment shown in Figs. 11–17, the shafts 91 and 92 are not permitted to shift axially by any appreciable amount. The axial movement permitted in these shafts is only sufficient to permit free rotation. However, the shifting of the control ring 99 does occur in response to the axial shifting of an element which is well shown in Figs. 11 and 12 and which is associated with the primary shaft 91 by means of a pair of studs which extend from the primary shaft 91 and which engage angularly disposed slots which are formed in the aforementioned element.

The aforementioned axially shiftable element is referred to herein as a sleeve coupling and is so termed because it acts to couple the primary and the secondary shafts under circumstances to be set forth herein. The sleeve coupling is designated by the numeral 108 and comprises a portion 108a which is internally splined and which embraces the splined portion 93b of the secondary shaft 93 and is capable of shifting axially relative thereto. The sleeve coupling portion 108a also has a peripheral groove 109 therein which is designed for the purpose of receiving and shifting axially the inwardly extending studs 110 and 111 of the control arms 104a and 106, respectively. The latter studs fit within the groove 109 with a small tolerance and consequently are shiftable axially with the sleeve coupling 108. The studs or pins 110, 111, are analogous to the pins 85 of Fig. 8. The control arms 104a and 106 are each provided with a stationary pivot pin 112, that is, one for each of such two diametrically opposed control arms 104a, 106. Consequently an axial shifting of the sleeve coupling 108 will produce an angular shifting of such control arms about the pivot pins 112 whereby the control ring 99 is shifted in a path transverse to the axis of the shaft 92.

The means for controlling the axial movement of the sleeve coupling 108, and hence the position of the control ring 99, comprise, in the embodiment of Figs. 11–17, studs 113, 114 which protrude coaxially and diametrically opposed from the primary steering shaft 91 and which coact respectively with inclined slots 115, 116 (Figs. 11 and 13) formed in the righthand portion 108b of the sleeve coupling 108. Means are provided for resiliently holding each of the studs 113, 114 in a centered position in its respective slot. The extent of force exerted by such resilient means determines the minimum torque which will evoke a power assist from the fluid motor.

The aforementioned resilient means for centering studs 113, 114 in their respective slots comprises, for example, a pair of U-shaped yoke members 117, 118 (Fig. 13) which cooperate to embrace the sleeve coupling portion 108b (of rectangular cross section) with the studs 113 and 114 interposed between the extremities of the legs of such U-shaped yoke members. The legs of each of the U-shaped yoke members 117, 118 are slightly flared with respect to their respective bases in order to permit easy pivoting of each yoke member in response to shifting of the studs 113, 114 in their respective slots.

Opposed coil springs 119, 120 resiliently urge the yoke members 117, 118 respectively toward the axis of the shaft 91. Such coil springs are respectively mounted in recesses 121 and 122 formed in lugs 123 and 124, respectively, which are integral with the sleeve coupling member 108. The tension upon each of the springs 119 and 120 is controlled by the adjustment of threaded nuts 125, 126, respectively, each of which preferably is held in its adjusted position by means of a cotter pin, one of which is shown at 127 (Fig. 12).

The aforementioned slots 115 and 116 are inclined in opposite directions in such a manner that the torque applied to the shaft 91 will produce an axial shifting of the sleeve coupling 108, providing such torque is adequate to overcome the springs 119, 120 and to cause the yoke members 117, 118 to pivot about diagonally opposed corners of such yoke members, as viewed in Fig. 13.

One of the principal distinctions of the embodiment of Figs. 11–15 over the previously described embodiments is the elimination of the valve means 56 and the employment of a new type of valve means for controlling the flow of fluid to the fluid motor 95.

Such valve means will now be described. Fluid from the pump 26 (Fig. 1) is directed via the conduit 27 to the fluid inlet 128 (Fig. 11) which is formed within a stationary plate 129 comprising a lefthand portion of a housing 130 for the sleeve coupling 108. Said plate 128 also comprises the righthand face plate of a housing 131 for the fluid motor 95.

Instead of directing fluid to the vanes of the fluid motor via arcuate grooves formed in the face plate (for example, at 54 and 55 above described) the arcuate grooves are formed upon the inner surface of the control ring 99. I have found it desirable to employ a pair of such inlet grooves 132 and 133 (Fig. 12) which are substantially semicircular in angular extent, as is well shown in Fig. 14, wherein the groove 133 extends 180° on the lefthand side of an axis 134 which is analogous to the above described axis 53.

A pair of exhaust grooves 135 and 136 (Fig. 12) are formed on the opposite side of the axis 134 but are of lower angular extent, preferably each being 45°, as shown in Fig. 14.

Communication between the inlet grooves 132, 133 and the inlet orifice 128 is had by means of a passage 137 having an outlet 138 which directs fluid into a longitudinally extending passage 139 which passes through the control ring in a direction parallel to the axis of the shafts 91, 93 and directs fluid to a balancing groove 140 formed in a lefthand face plate 141 of the motor housing 131. The dimension of the orifice 138 measured vertically in Fig. 11 is substantially greater than the thickness of the passage 139 and preferably is equal to the extent of transverse movement of the control ring 99. Consequently throughout such transverse movement fluid from the pump 26 will be directed into the passage 139 and from thence into the two inlet grooves 132, 133 via a passage 142 (Fig. 14).

To prevent such fluid from urging the control ring leftward (Fig. 11) against the face plate 141, thereby binding its movement, the aforementioned balancing groove 140 is provided which provides an equal and opposite fluid pressure.

Figure 15:
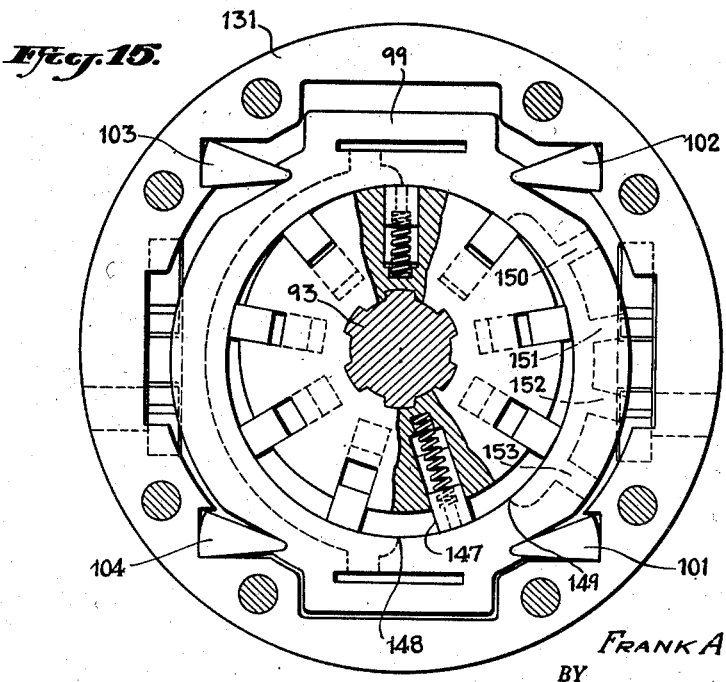
Fig. 15 is also a sectional view taken substantially on line 14—14 of Fig. 11 but with the aforementioned control ring in an accentric operating position.

A control ring outlet passage 143 (Fig. 14) is provided in the bottom of the control ring diametrically opposite to the aforementioned passage 139 and in communication with the lower portion of each of the inlet grooves 132, 133 via passages 144. The cross sectional shape of the passages 139, 143 is preferably elongated and, for example, rectangular. The passages 139, 143 are preferably parallel. The outlet passage 143 coacts with an outlet orifice 145 formed in the lower portion of the plate 129, such outlet orifice 145 being in communication with a main outlet 146 which is connected to the conduit 28 (Fig. 1). The cross section of the orifice 145 corresponds to the cross section of the rectangular passage 143 both in shape and size. When the control ring is in a neutral position such passage 143 and orifice 145 are in register, as shown in Fig. 11. Consequently movement of the control ring out of the neutral position will progressively close the orifice 145, and thereby actuate the fluid motor 95 for the following reasons: When the orifice 145 is in register with the passage 143, the fluid is able to pass freely through the motor via the upper rectangular passage 139, the passages 142, the inlet grooves 132, 133, passages 144 and thence the lower rectangular passage 143. However, movement of the control ring out of its neutral position, for example, will close the orifice 145, the ring being transversely shifted e. g. to the position shown in Fig. 15 wherein the extent of protrusion of the radial vanes becomes progressively greater toward the lower portion of the rotor. Because the exhaust grooves 135, 136 have no pressure therein, there is created a pressure differential on opposite sides of, for example, a vane 147 so long as such vane is between the points 148 and 149 which respectively designate the end of the inlet grooves and the commencement of the exhaust grooves. Consequently the fluid motor is rotated in a counterclockwise direction (Fig. 15). The fluid, upon reaching the exhaust grooves 135, 136, passes therefrom via exhaust passages 150–153, inclusive, and thence into the space 153A (Fig. 14) which is between the outer housing of the fluid motor and the control ring 99. The fluid passes from such chamber 153A into chamber 154, within the housing of the sleeve coupling 108, via slots 155, 156 through which extend the arms 104 and 106. From chamber 154 the fluid can exhaust via the outlet 146 (Fig. 11).

When the outlet orifice 145 is in register with the lower rectangular passage 143, the upper rectangular passage 139 is centrally disposed with respect to the inlet orifice 138.

Thus in effect the form of the second embodiment of Figs. 11–15 is in the nature of an open center type of valve means in view of the fact that the fluid passes freely therethrough while the control ring is in its neutral position.

Figure 16:
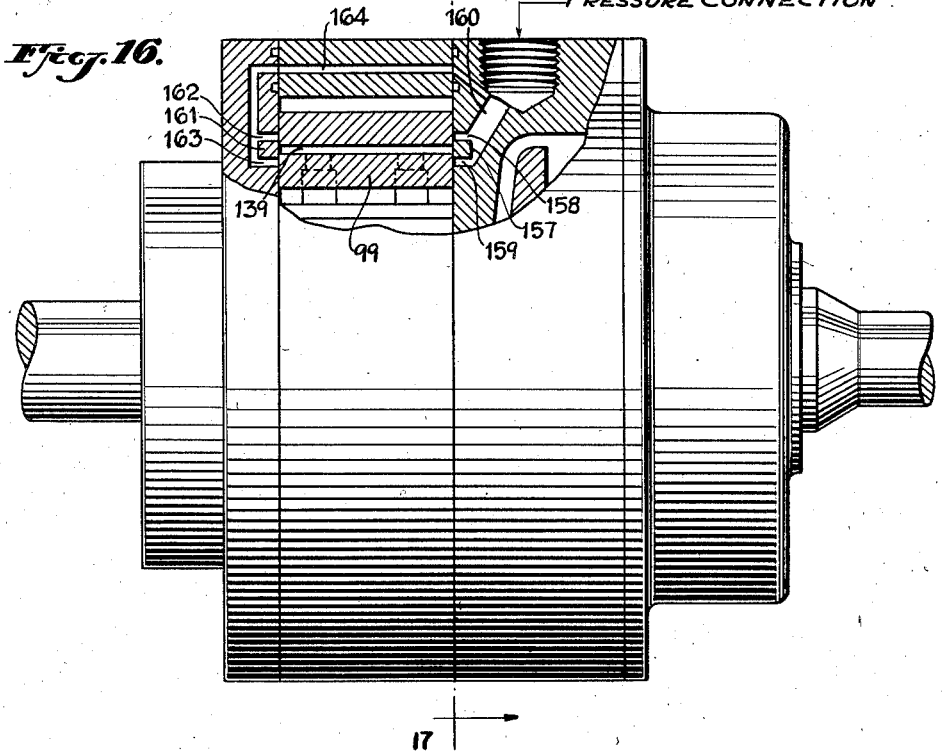
Fig. 16 is a side elevation, partly in section and with parts broken away, of a modification of the embodiment of Fig. 11.
Figure 17:
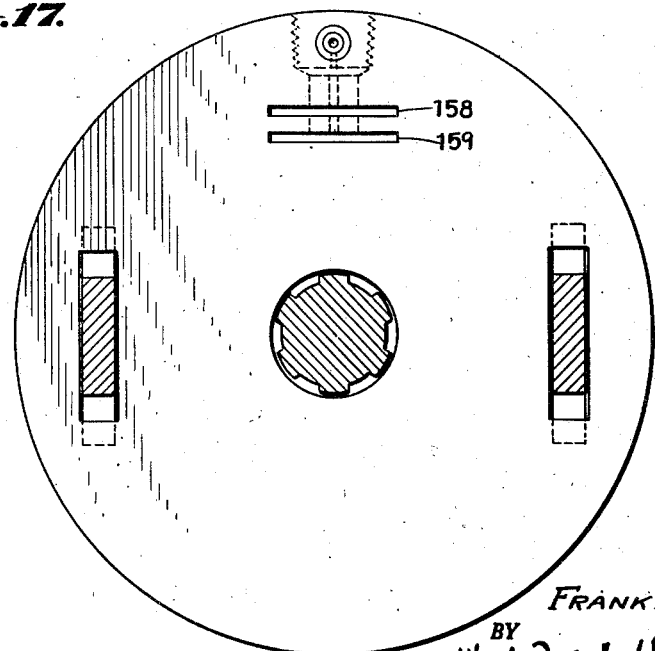
Fig. 17 is a sectional view taken substantially on line 17—17 of Fig. 16.

A modification of such second embodiment is shown in Figs. 16 and 17 which is identical thereto with the exception that a closed center or constant pressure type of valve means is employed. In lieu of the inlet orifice 138 which freely communicates with the upper rectangular passage 139 at all times, a closed center block 157 is employed which closes the upper rectangular slot 139 when the control ring 99 is in a neutral or concentric position. Passages 158 and 159 are disposed respectively above and below the closed center block 157 and are thus placed in communication with the passage 139 whenever the control ring 99 moves an adequate extent upwardly or downwardly from its centered position of Fig. 16. The passages 158, 159 are in communication with a common inlet passage 160.

In order to provide suitable balancing forces for the control ring 99, an opposed closed center block 161 is provided above and below which are passages 162 and 163 which exert pressures upon the control ring equal to and opposite to those which are incidental to the passages 158, 159. The passages 162, 163 are in communication with passage 160 via an intermediate passage 164.

Referring now to the conformation of the radially extending vanes of the embodiment of Figs. 11–17, I have found it advantageous, as is well shown in Fig. 11, to conform each vane, as at 165, with a convex or arcuate inner region 166. It is desirable to reduce the diameter of the fluid motor as much as possible and consequently the radius of the rotor 94 should be at a minimum consistent with adequate strength. Also shaft 93 should be as large as is consistent with the other factors of design in order to be of maximum strength. Furthermore, in order to aid in obtaining proper sealing of the motor housing, the dimension between points 167 and 168 (Fig. 11) should be as large as possible. Consequently, I have found it desirable to form the slots 97 for the reception of each of the vanes with a concave cross section, as viewed in Fig. 11 thereby to accommodate the convex region 166 thereby to provide an adequate degree of penetration of each vane into its respective slot. If such degree of penetration is too small, the vanes tend to wedge in their slots and thus to become locked when they protrude to the maximum extent, for example, as at 147 in Fig. 15. However, the degree of penetration is adequate to prevent such wedging and locking if the vane is formed as shown in cross section in Fig. 11 and simultaneously the dimension between the points 167 and 168 is of adequate extent.

Each of the vanes of the embodiment of Figs. 11–17 is urged outwardly by a pair of coil springs, one of which is shown at 52 in Fig. 10. Each of such springs engages a pair of suitable recesses, there being one recess in the rotor and one in the vane. These recesses preferably are of a common diameter. Such a vane recess is shown at 169 (Fig. 11). Each recess 169 is in communication with the outer face of the vane via a passage 170. Consequently, there are two such recesses 169 in each vane, each in alignment with its respective passage 170.

Thus the outer and inner faces of each vane are placed in communication with one another whereby equality of fluid pressure is attained therein and consequently the springs 52 are the sole means which act to urge the vanes outwardly.

I have found it desirable for the outer face of each vane, which engages the inner surface of the control ring, to be a plane surface perpendicular to a radius passing through the center of the vane.

Reverting to the modification of Figs. 16 and 17, when the control ring 99 is in its concentric position, no pressure exists in channel 139. When the control ring 99 moves upwardly or downwardly (Fig. 16), fluid is communicated to channel 139 either via passage 158 or 159 to allow flow of fluid to act upon the vanes of the rotor. There are eliminated from the embodiment of Figs. 16 and 17 the lower passage 143, with its corresponding outlet orifice 145 of Fig. 11. Nevertheless, in the modification of Figs. 16 and 17 the fluid discharges through the discharge passages 150–153, inclusive, and thence to the outlet 146 via the slots 155, 156.

What is claimed is:

1. In a steering gear device employing hydraulic power to assist manual power in steering, the combination including: a steering shaft mounted for axial movement within preselected limits; a thrust block embracing said shaft and constructed and arranged to move axially therewith; means for resiliently holding said thrust block and consequently said steering shaft in a preselected norm position; reduction gear means connected to said shaft for transmitting power therefrom to a steering arm, said shaft when turned being axially shiftable in response to the extent of reaction in said reduction gear means; a reversible fluid motor connected to said shaft and including a rotor to which fluid power is applied for the purpose of assisting the aforementioned manual power in steering, said rotor being within an internal chamber of a housing; a shiftable control ring arranged in said chamber and surrounding said rotor, said ring having a substantially circular cylindrical inner surface which is substantially concentric with said rotor when the ring is in neutral position, fluid passage means opening into said chamber for conducting fluid under pressure to said rotor for turning same, said rotor being provided with radial slots, vanes slidably mounted in said slots, means for resiliently urging said vanes radially outwardly toward the inner surface of said ring; guide means for said shiftable ring for guiding the movement thereof along a path transverse to the axis of said shaft whereby said ring can be moved from the aforementioned neutral position in either direction along such transverse path; and valve means for controlling the flow of fluid to said fluid conducting passageways; said valve means being operable in response to the axial movement of said thrust block, said shiftable ring and valve means normally being held in a neutral position when said thrust block is in its aforementioned norm position.

2. In a power steering device the combination including: a steering shaft; a thrust block embracing said shaft and constructed and arranged to move along the axis of said shaft; means for resiliently holding said thrust block in a norm position on the axis of said shaft; reduction gear means connected to said shaft for transmitting power therefrom; a reversible fluid motor connected to said shaft and including a rotor coaxial with and embracing said steering shaft to which fluid power is applied for the purpose of assisting the aforementioned manual power in steering, said rotor being within an internal chamber of a housing; a shiftable ring arranged in said chamber and surrounding said rotor, said ring having a substantially cylindrical inner surface which is substantially concentric with said rotor when the ring is in a neutral position, fluid means opening into said chamber for conducting fluid under pressure to said rotor, the latter being provided with radial slots, vanes slidably mounted in said slots, means for resiliently urging said vanes radially outwardly toward the inner surface of said ring; guide means for said shiftable ring for guiding the movement thereof along a path transversely of the axis of said shaft whereby said ring can be moved from the aforementioned neutral position in either direction along such transverse path; valve means for controlling the flow of fluid to said fluid fluid conducting passage means; said valve means being drivably connected to said shiftable ring for movement therewith, said shiftable ring and valve means being held in a neutral position when said thrust block is in its aforementioned norm position.

3. In a power steering device, the combination including: a steering shaft mounted for axial movement within preselected limits; means for resiliently holding said steering shaft in a norm position; a reversible motor including a housing having an internal chamber, a rotor connected to said shaft for turning the latter, a shiftable ring mounted in said chamber and surrounding said rotor, said ring having a substantially circular inner surface which is substantially concentric with the periphery of said rotor when the ring is in a neutral position, said housing being provided with opposite arcuate ports for conducting fluid with respect to said rotor, said rotor being provided with radial slots, vanes slidably mounted in said slots, means in said internal chamber for guiding movement of said shiftable ring in a path transverse to the axis of rotation of said rotor and substantially lengthwise of said arcute ports whereby said ring is movable from said neutral position wherein the inner surface thereof is substantially concentric with said rotor to one wherein such surface is eccentric with respect to said rotor thereby producing a crescent-shaped chamber between the rotor and such inner surface; valve means for controlling fluid flow with respect to said arcuate ports; and means responsive to axial movement of said steering shaft for simultaneously shifting said ring and valve means, said ring and valve means being neutrally positioned in response to said shaft being resiliently held in its norm position.

4. In a power steering device, the combination including: a reversible motor including a housing having an internal chamber, a rotor connected to said shaft for turning the latter, a shiftable control ring mounted in said chamber and surrounding said rotor, said ring having a substantially cylindrical inner surface which is substantially concentric with the periphery of said rotor when the ring is in a neutral position, said housing being provided with opposite arcuate ports for conducting fluid with respect to said rotor, said rotor being provided with radial slots, vanes slidably mounted in said slots, means in said internal chamber for guiding movement of said shiftable ring in a path transverse to the axis of rotation of said rotor and substantially lengthwise of said arcuate ports whereby said ring is movable from said neutral position wherein the inner surface thereof is substantially concentric with said rotor to one wherein such surface is eccentric with respect to said rotor; valve means for controlling fluid flow with respect to said arcuate ports; and means responsive to thrust acting axially of said steering shaft for simultaneously shifting said ring and valve means, said ring and valve means being neutrally positioned in response to said shaft being resiliently held in its norm position.

5. In a power steering device employing fluid for transmitting power to assist manual power for steering, the combination including: a steering shaft, a motor including a housing having an internal chamber, said steering shaft extending into said chamber, a substantially circular rotor secured to and coaxially mounted with said steering shaft, a shiftable control ring mounted in said chamber for movement in a path transverse to the axis of said shaft, said control ring surrounding said rotor and having a cylindrical inner surface which is positionable concentric with the cylindrical outer surface of said rotor, said ring being in a neutral position when so positioned concentrically, said ring also being movable along the aforementioned transverse path to positions on either side of said neutral position, inlet and exhaust port means respectively on opposite sides of said path for conducting fluid relative to said rotor, said rotor having a plurality of radial slots formed therein, a plurality of vanes slidably mounted in said slots, means for yieldingly urging said vanes radially outwardly toward said inner cylindrical control ring surface, and means for operatively interconnecting said control ring with said steering shaft for moving said control ring in response to thrusts acting axially of said shaft.

6. In a power steering device employing fluid for transmitting power to assist manual power for steering, the combination including: a steering shaft, a motor including a housing having an internal chamber, said steering shaft extending into said chamber, a rotor secured to and coaxially mounted with said steering shaft, a shiftable control ring mounted in said chamber for movement in a path transverse to the axis of said shaft, said control ring surrounding said rotor and having an inner surface which is positionable concentric with said shaft, said ring being in a neutral position when so positioned concentrically, said ring being movable along the aforementioned transverse path to positions on either side of said neutral position, port means formed on opposite sides of said path for conducting fluid relative to said rotor, said port means including arcuate inlet grooves on one side of said path, and arcuate exhaust grooves on the other side thereof, said control ring having an inlet formed therein for said grooves, which inlet in cooperation with an orifice in said housing comprises valve means for said grooves, said rotor having a plurality of radial slots formed therein, a plurality of vanes slidably mounted in such slots, means for yieldingly urging said vanes radially outwardly toward said inner ring surface, and means for measuring the extent of reaction between torque initially applied to said shaft and the resistance to such torque for controlling the position of said control ring along said transverse path.

7. In a power steering device employing fluid for transmitting power to assist manual power steering, the combination including: a steering shaft, a motor including a housing having an internal chamber, a rotor drivably connected to said steering shaft, a shiftable control ring mounted in said chamber for movement in a path transverse to the axis of said rotor, said control ring surrounding said rotor and having an inner surface which is positionable concentric with said rotor, said ring being in a neutral position when so positioned concentrically, said ring being movable along the aforementioned transverse path to positions on either side of said neutral position, said housing having formed therein on opposite sides of said path ports for conducting fluid relative to said rotor, said rotor having a plurality of radial slots formed therein, a plurality of vanes slidably mounted in said slots, means for yieldingly urging said vanes radially outwardly toward said inner control ring surface, an element movable axially of said shaft, means for resiliently holding such element in a norm position, means responsive to the reaction between torque initially applied to said shaft and resistance to such torque for urging said element out of said norm position, and means for operatively interconnecting said element and control ring whereby the transverse movement of the latter is responsive to such reaction.

References Cited in the file of this patent
UNITED STATES PATENTS

| | | |
|---|---|---|
| 1,467,209 | Sumner | Sept. 4, 1923 |
| 1,840,869 | Rayburn | Jan. 12, 1932 |
| 1,981,805 | Kacer | Nov. 20, 1934 |
| 2,199,081 | Perin | Apr. 30, 1940 |
| 2,309,148 | Wilson | Jan. 26, 1943 |
| 2,420,155 | Tucker | May 6, 1947 |
| 2,487,321 | Ericson | Nov. 8, 1949 |